United States Patent [19]

McIver

[11] Patent Number: 4,787,511

[45] Date of Patent: Nov. 29, 1988

[54] MIXING BAG WITH PLURAL COMPARTMENTS

[75] Inventor: Lesley E. McIver, Deeside, United Kingdom

[73] Assignee: Inotec Laboratories Limited, Clwyd, England

[21] Appl. No.: 135,707

[22] Filed: Dec. 21, 1987

[30] Foreign Application Priority Data

Dec. 19, 1986 [GB] United Kingdom ............... 8630345

[51] Int. Cl.$^4$ ............................................. B65D 25/08
[52] U.S. Cl. .................................... 206/219; 493/189; 493/931; 53/DIG. 2; 383/80
[58] Field of Search ........................ 206/219, 222; 53/DIG. 2; 493/931, 189; 383/80, 38

[56] References Cited

U.S. PATENT DOCUMENTS

| 4,458,811 | 7/1984 | Wilkinson | 206/219 |
| 4,519,499 | 5/1985 | Stone et al. | 206/219 |
| 4,557,377 | 12/1985 | Maloney | 206/219 |
| 4,657,134 | 4/1987 | Woodworth et al. | 206/219 |

FOREIGN PATENT DOCUMENTS 1144883 4/1957 France ............................... 206/219

Primary Examiner—William Price
Attorney, Agent, or Firm—Scrivener and Clarke

[57] ABSTRACT

The pack is adapted to store separately and allow mixing of a plurality of components and subsequent dispensing of the mixture. It comprises an outer container (1) and a preferentially rupturable inner container (2) having its outer surface sealed to the inner surfaces of said outer container walls at a median point of the outer container and adjacent an end of said inner container. The wall of said inner container (2) between seals (3) defines a first compartment (9) within said inner container (2) to one side of said seal (3) and a second compartment (7) within said outer container (1) to the other side of said seal (3). A recloseable inlet and outlet means (4,5) communicates with said second compartment (7). One way of making the pack is to place the inner container (2) within one open end of the open ended outer container (1), inserting a spatula into the inner container (2) to separate its two sides, and sealing line an outer surface of said inner container means to an inner surface of said outer container. Other methods are also disclosed. The pack is useful for storing, mixing and dispensing agriculturally useful two or component compositions, such as seed coating compositions containing micro-organisms.

9 Claims, 3 Drawing Sheets

MIXING BAG WITH PLURAL COMPARTMENTS

The present invention relates to packs in which two or more components can be mixed and the mixture dispensed therefrom, and to methods of making such packs. It also relates to useful compositions which may be contained in such packs.

The present invention was developed for use with agriculturally useful micro-organisms. The invention will be described with reference to this preferred use, but it should be realised that many other uses may be found for the pack of the present invention.

Two component packs in which two components may be mixed are well known, one example being disclosed in British Pat. No. 2096570. This patent discloses a bag having within it a smaller bag, the bags being sealed together at one open end. An inlet is provided to the inner bag to allow it to be filled with liquid. When it is desired to mix the contents of the inner and outer bags, the pack is squeezed until the inner bag breaks, thereby mixing the contents. However the walls of the inner bag, once broken, tend to act as flaps and form a non-return valve. The mixture cannot then be dispensed through the opening. It is necessary to make an aperture in the outer bag. This is inconvenient in many circumstances.

It is an object of the present invention to provide a pack which will enable a plurality of components to be mixed within the pack and subsequently dispensed therefrom.

It is another object to provide a manner of manufacturing such a pack.

It is yet another object to provide a useful agricultural composition which can be stored and mixed in such a pack and dispensed therefrom.

As stated above, the present pack was developed for use with agriculturally useful micro-organisms. More particularly, it was developed for use with seed coating compositions. The micro-organisms are grown in a moist peat medium while the pack is in storage. The end user adds water, shakes or manipulates the pack to mix the peat and water, and pours out the resulting mixture. In some, but not all, applications, it requires that the mixture is thicker to coat the seeds more effectively. Thus it is desirable to provide a thickener composition for admixture with the peat and water components. However, this must be kept separate until mixing for three reasons. Firstly, the thickener may not be required by the user. Secondly, the thickener should be kept dry until mixing and, since the peat is moist, they must be kept separate. Thirdly, the thickener is not sterile and cannot be sterilised easily, while the peat has been sterilised before mixing with the micro-organisms. The thickener must be added separately after sterilisation. The need for a pack of this type can thus be appreciated.

According to one aspect of the present invention there is provided a pack adapted to allow mixing of a plurality of components and subsequent dispensing of the mixture, the pack comprising an outer container, a preferentially rupturable inner container having its outer surface sealed to the inner surfaces of said outer container walls at a median point of the outer container and adjacent an end of said inner container, the wall of said inner container between said seals defining a first compartment within said inner container to one side of said seal and a second compartment within said outer container to the other side of said seal, and a recloseable inlet and outlet means communicating with said second compartment.

Preferably the inlet and outlet means is provided with a screwable cap closure.

Advantageously, each of the two compartments is sealed adjacent its outer end after filling with a respective component.

The material of the container may have good barrier properties to water and water vapour but poor barrier properties to gases.

Preferably the material is polyethylene advantageously low density polyethylene.

The material of the rupturable membrane is also preferably polyethylene, but thinner so as to rupture preferentially.

According to a second aspect of the present invention there is provided a method of making a pack comprising the steps of so placing inner container means within one open end of an open ended outer container means that two sides of the inner container means lie adjacent and within walls of the outer container means and a folded portion joining said two sides lies innermost within the outer container means; inserting into said inner container means a spatula means to separate the two sides thereof; sealing along a line adjacent said folded portion whereby an outer surface of said inner container means is sealed to an inner surface of said outer container means; and removing said spatula means.

Preferably the method may include the additional step of sealing along both edges of the conjoined container means to impart additional strength.

Recloseable inlet and outlet means may be sealed into an open end of the outer container means.

A final step of sealing the ends of the conjoined container means may be carried out after filling, through respective ends, the compartments defined within the conjoined container means.

According to a third aspect of the present invention there is provided a pack made by the method of the second aspect.

According to a fourth aspect of the present invention there is provided an agriculturally useful composition contained in a pack according to the first or third aspects of the invention, in which a first component of said composition is contained within said first compartment of the pack, and a second component is contained within said second compartment of the pack, whereby at the time of use, liquid may be added through said recloseable inlet and outlet means for mixing with the component contained in the second compartment, the mixture being pourable out of the recloseable means, the separating wall of said inner container having optionally been ruptured at the time of use to allow the component contained in the first compartment also to be admixed.

Preferably the component in the second compartment is a growing medium containing bacteria.

The medium may be moist peat.

The bacteria may be Rhizobium.

The component in the first compartment may be a thickening agent.

Alternatively, the component in the first compartment may be a growing medium containing a different bacteria.

According to a fifth aspect there is provided a method of treating seed comprising the steps of providing a pack containing a composition according to the fourth aspect, inserting a liquid into the second compartment, mixing the component therein with said liquid, squeezing the pack to rupture the separating wall, mixing the component in said first compartment with said admixture; and dispensing the total mixture onto seeds.

An embodiment of the present invention will now be more particularly described by way of example and with reference to the accompanying drawings, in which.

Figure 1:
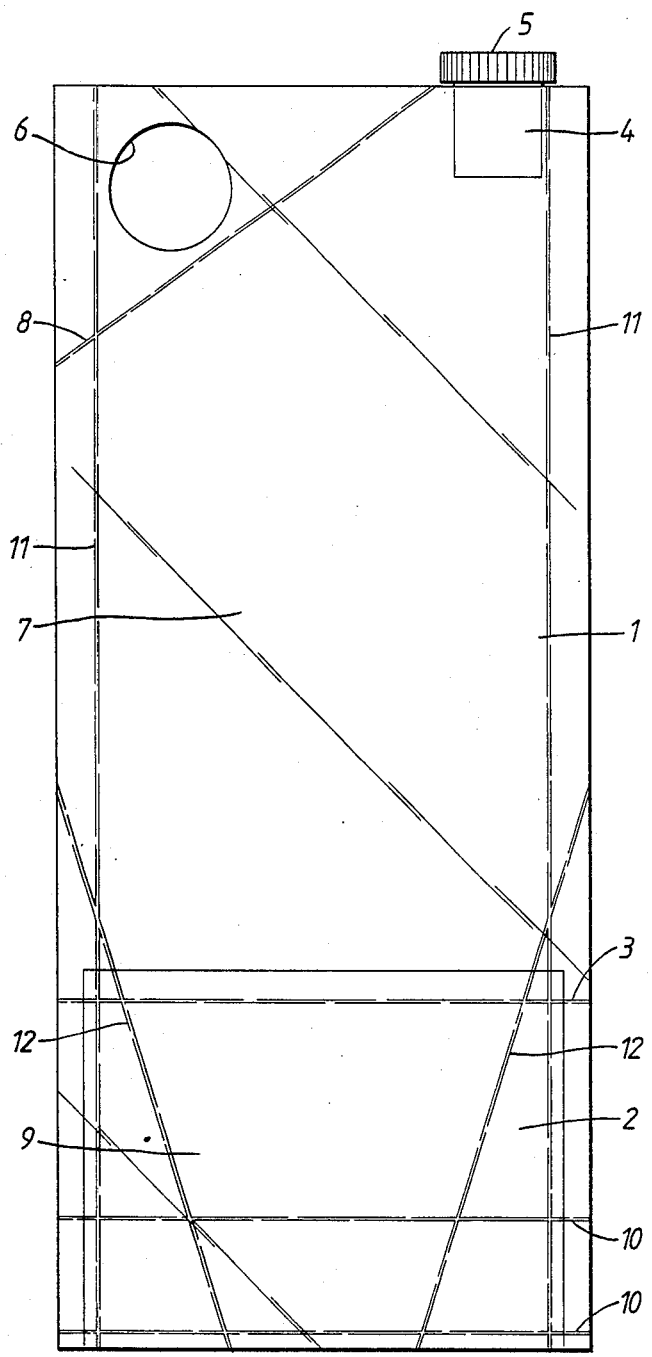
FIG. 1 is a front elevation of a pack embodying the invention.
Figure 3:
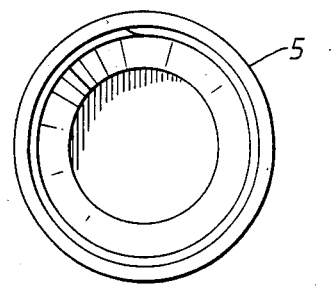
FIGS. 3-5 are respectively plan, elevation and cross-section of a recloseable cap.

Referring now to the drawings, there is shown in FIG. 1 a pack which comprises essentially an outer bag 1 made from a comparatively thick (c. 100 microns) layflat tube of low density polyethylene. Within this outer bag 1 is an inner bag 2, located at one end and made of comparatively thin (c. 30 microns) polyethylene. The two bags are joined by heat seal 3 so that the outer surfaces of inner bag 2 are welded to the inner surfaces of outer bag 1, without the inner surfaces of inner bag 2 being welded together. This can be achieved by inserting a thin spatula into the inner bag 2, inserting the inner bag 2 into the outer bag 1 and heat sealing along the appropriate seal line, applying heat at both sides of the outer bag 1. The spatula prevents the inside faces of the inner bag from sealing together.

Additional longitudinal seals 11 may be provided along the edges of outer bag 1, sealing its faces together in one part and all four thicknesses together where they are present.

Angled seals 12 may also be provided for additional strength.

Figure 2:
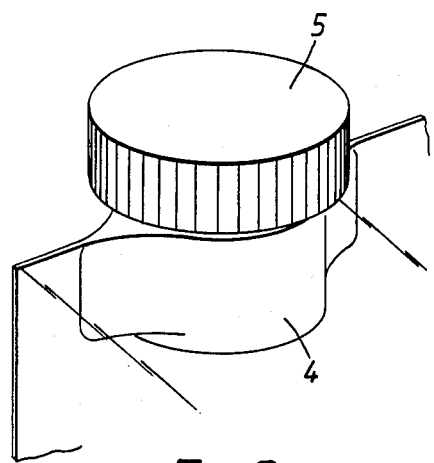
FIG. 2 is a perspective view of a closure for the pack.
Figure 4:
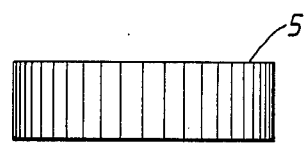
Figure 5:
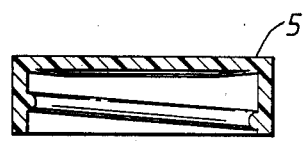
Figure 6:
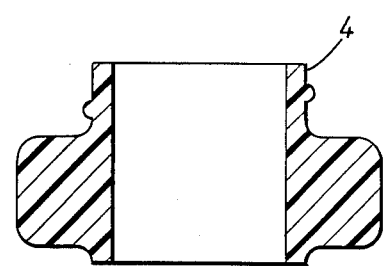
FIGS. 6 and 7 are respectively a cross-section and plan view of the neck of the closure.
Figure 7:
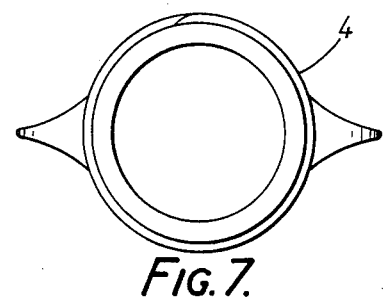

At the end of the outer bag 1 remote from the inner bag 2 is located a pouring spout 4, sealed in position in one corner of the bag. A preferred version of the pouring spout is shown in more detail in FIGS. 2, 6 and 7. The pouring spout 4 is closeable by means of a screw-threaded cap 5. An aperture 6 may be provided in the outer bag 1 adjacent the spout 4 to allow the pack to be carried.

The pack, in the condition described, is now ready for filling, which will be described with reference to its primary use for agriculturally useful micro-organisms.

Seal line 3 divides the pack into two compartments, one each side of the seal line. A second compartment 7 is filled with moist peat and this compartment is then sealed along seal line 8. The pack is then sterilised by irradiation and the pack placed in a sterile cabinet. The cap 5 is removed and a culture of the desired micro-organism is added to the peat through the pouring spout 4. The cap is replaced and the pack inverted.

The seal line 3 also defines a first compartment 9 which lies within the inner bag 2. This compartment is filled with the required amount of a thickener composition and the compartment heat sealed along seal lines 10. These seal lines join together both the inner bag 2 and the outer bag 1 along the same lines. All four thicknesses of polyethylene are thereby sealed together.

The above procedure is necessary because the peat must be sterile before the culture is added and because the radiation used for sterilisation may damage the thickener composition.

The pack is then stored to allow the microorganism to grow. This is possible because of the use of polyethylene which is permeable to gases. For example, at 25° C., one atmosphere pressure, 0% relative humidity, a 100 micron film of polyethylene has gas transmission rates of: oxygen 2000 $cm^3$ per meter of film per 24 hours; and of carbon dioxide 9000 $cm^3$ per square meter per 24 hours. Thus, during incubation, the carbon dioxide may escape and oxygen may be admitted. The figures for gas transmission rate of low density polyethylene are considerably higher than those for other plastics materials (e.g. laminates of polyethylene/polyester or polyethylene/nylon).

When the pack arrives for end use, the cap 5 is unscrewed, and a predetermined quantity of water or other liquid added through the pouring spout 4. The cap 5 is closed and the contents mixed. If no thickener is required for the particular purpose in hand, the cap 5 is opened and the mixture poured out through the pouring spout 4. The pack containing unused thickener may then be discarded.

If it is required to use a thicker composition, the water and peat may be mixed as before, but before reopening the cap 5, the bag is manipulated, for example by rolling from one end, until the membrane breaks allowing the thickener in compartment 9 to mix with the peat and water in compartment 7. The bag is again mixed as before and the mixture dispensed through pouring spout 4 after removal of the cap 5.

As can be seen, the end user has the option of dispensing either a simple peat and water mix, or a peat/water/thickener mix.

The liquid added may contain a fungicide which may contain its own thickener or be itself viscous. In such cases the thickener may not be needed.

The use of polyethylene for the walls of the bags 1 and 2 has additional advantages in that the material is cheap and is slightly extensible, thereby tending to give rather than fracture if the pack is dropped.

If so desired, the inner bag 2 may be ruptured before admitting water to the peat so that the peat and thickener mix first, which mixture is later admixed with the water or aqueous liquid.

As stated above, the invention has been described with reference to its use as a container for a three component mixture of agriculturally useful micro-organisms. In this case, the first component is an aqueous component comprising water which may optionally contain other adjuvants, which if solid, may be in solution or suspension, or if fluid, may be admixed, emulsified or as separate phases. The second component is the micro-organism component which comprises microorganisms growing in a moist peat medium. The third component is a treatment component, e.g. a thickener. If so desired, other components may be added through the pouring spout 4 immediately prior to mixing.

The compositions included in the various components may, of course, be changed and thus many other uses of the pack can be envisaged. For example the pack may contain two microorganisms, each incubating separately in their own compartment, and being mixable most advantageously only just before use.

For various uses, the relative volumes of the compartments may be different. According to the present method of manufacture, this presents no problems. The size of inner bag 2 may be increased or decreased as necessary and the seal line 3 moved appropriately to be adjacent the closed end of the inner bag 2.

If additional components are necessary for the final composition, the inner bag 2 may be sealed longitudinally along a median portion to define two or more compartments side by side.

One preferred composition for use in packs of this type is a composition for inoculating soybeans (or other leguminous plants). In this case the bacteria used is a Rhizobium (Rhizobium japonicum being most advantageous for soy beans). The Rhizobium is incubated on moist peat in the second compartment 7 and a thickener is provided in the first compartment 9. As stated above, the thickener may not be required if a fungicidal aqueous composition is used as mixing liquid.

The pack contains the correct amount of components for treatment of a predetermined quantity of seeds. All that the farmer need do is add water, mix the contents of the pack and pour the mixture onto the seeds. The pack is thus more convenient to store and use than those known hitherto.

Since the peat or other growing medium is sterilised prior to the addition of the micro-organism, the pack may be stored for quite considerable periods without deterioration. In fact the micro-organism population may well increase during storage.

As stated above, use of the pack is not limited to micro-organisms, but it may be used for other two or more component compositions.

Figure 8:
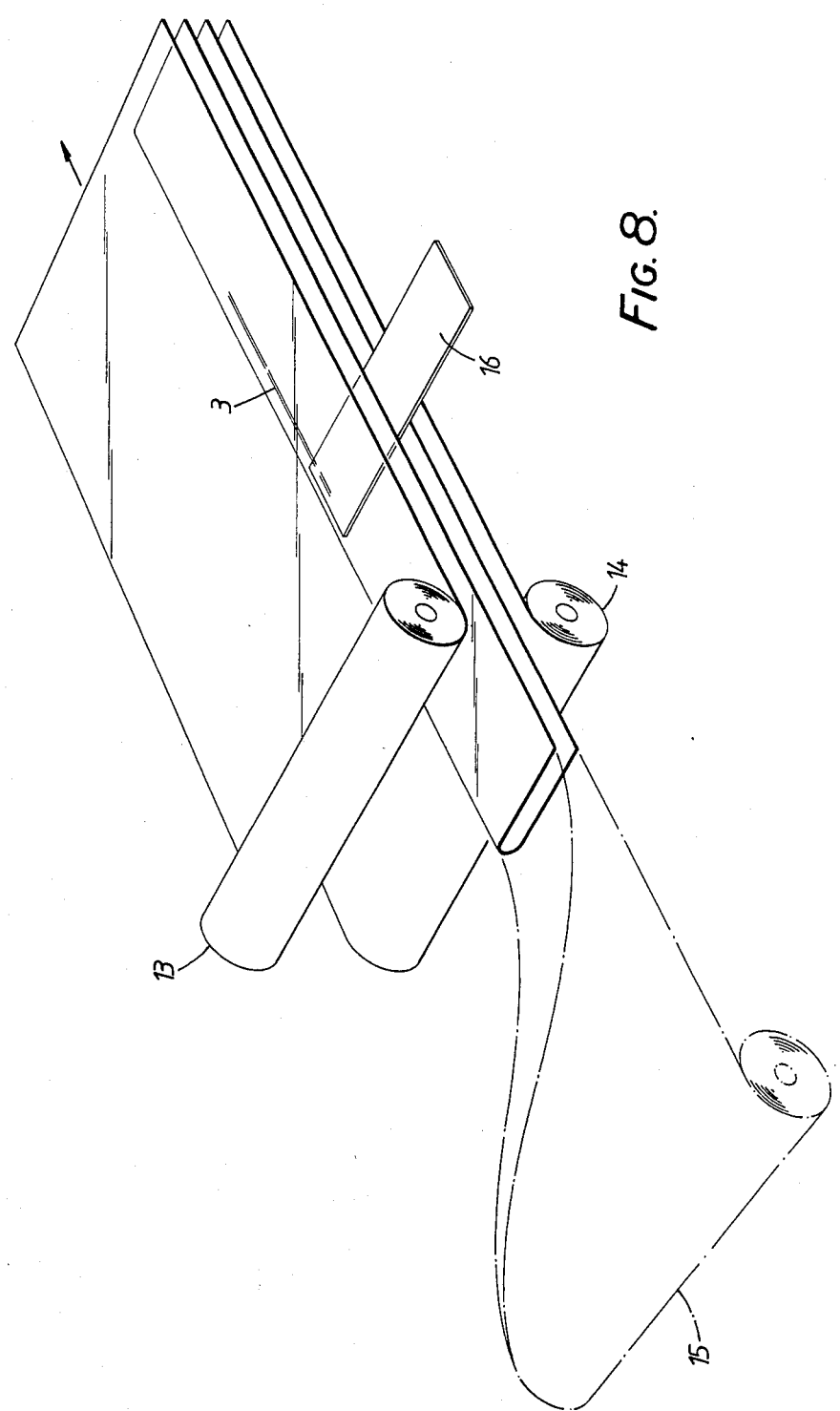
FIG. 8 shows schematically one method of manufacturing the packs.

A second, continuous method of manufacturing packs is shown in FIG. 8. In this method the outer bag 1 is fed as two separate sides from rolls 13 and 14. The inner bag 2 is fed from another roll 15 and is folded before passing between rolls 13 and 14, to have an open edge adjacent one edge of the webs which form outer bag 1. A spatula device 16 is located within the inner bag material at a point where it is sandwiched by the outer bag material, and at this point the inner surfaces of outer webs are heat sealed to the outer surfaces of the inner web in a continuous manner.

At a further station in the direction of the arrow, transverse seals are applied to define the width of the packs produced. The length of the packs is determined to be no more than the width of the outside webs fed from rolls 13 and 14. The length of the inner bag 2 is determined to be no more than half the width of the inside web fed from roll 15.

Once the packs are formed, the pouring spout and additional seals as desired may be incorporated.

I claim:

1. A pack adapted to store separately and allow mixing of a plurality of components and subsequent dispensing of the mixture, the pack comprising an outer container, a preferentially rupturable inner container having its outer surface sealed to the inner surfaces of said outer container walls at a median point of the outer container and adjacent an end of said inner container, the wall of said inner container between said seals defining a first compartment within said inner container to one side of said seal and a second compartment within said outer container to the other side of said seal, and a recloseable inlet and outlet means communicating with said second compartment.

2. A pack according to claim 1, wherein the inlet and outlet means is provided with a screwable cap closure.

3. A pack according to claim 1, wherein each of the two compartments is sealed adjacent its outer end after filling with a respective component.

4. A pack according to claim 1, wherein the material of the container has good barrier properties to water and water vapour but comparatively poor barrier properties to gases.

5. A method of making a pack comprising the steps of so placing inner container means within one open end of an open ended outer container means that two sides of the inner container means lie adjacent and within walls of the outer container means and a folded portion joining said two sides lies innermost within the outer container means; and sealing along a line adjacent said folded portion when a spatula means is located within said inner container means to separate the two sides thereof, whereby an outer surface of said inner container means is sealed to an inner surface of said outer container means.

6. A method according to claim 5, wherein the method includes the additional step of sealing along both edges of the conjoined container means.

7. A method according to claim 5, wherein a recloseable inlet and outlet means is sealed into an open end of the outer container means.

8. A method according to claim 5, including a final step of sealing the ends of the conjoined container means, carried out after filling, through respective ends, the compartments defined within the conjoined container means.

9. A pack made by the method of claim 5.

* * * * *